United States Patent [19]

Mishiro

[11] Patent Number: 4,620,121
[45] Date of Patent: Oct. 28, 1986

[54] PIEZOELECTRIC APPARATUS FOR ACTIVATING SQUARE PLATE RESONATOR

[75] Inventor: Shoji Mishiro, Kawasaki, Japan

[73] Assignee: Taga Electric Company, Limited, Tokyo, Japan

[21] Appl. No.: 804,150

[22] Filed: Dec. 3, 1985

[51] Int. Cl.⁴ .................................. H01L 41/08
[52] U.S. Cl. ........................... 310/323; 310/325; 310/328; 310/358; 310/366; 51/59 SS; 82/DIG. 9; 74/1 SS
[58] Field of Search ............... 310/323, 328, 366, 358, 310/325; 51/57, 58, 59 R, 59 SS; 82/2 R, DIG. 7, DIG. 9; 409/64, 76, 77, 308, 345, 346; 83/14, 701; 74/1 SS

[56] References Cited

U.S. PATENT DOCUMENTS

| | | | |
|---|---|---|---|
| 3,561,462 | 2/1971 | Jugler | 310/325 X |
| 3,754,448 | 8/1973 | McDaniel | 310/323 X |
| 4,562,373 | 12/1985 | Tokusima et al. | 310/328 |

Primary Examiner—Mark O. Budd
Attorney, Agent, or Firm—Oblon, Fisher, Spivak, McClelland & Maier

[57] ABSTRACT

An apparatus equipped with annular electrostriction elements each having four divided segmental electrodes with the respective polarities reversed alternately in the direction of thickness thereof. The annular electrostriction elements are so disposed that the center lines of division are positionally coincident with diagonal lines of a square plate resonator while passing through the surface center point thereof, whereby the corner portions of the resonator can be vibrated effectively at an ultrasonic frequency.

4 Claims, 9 Drawing Figures

PIEZOELECTRIC APPARATUS FOR ACTIVATING SQUARE PLATE RESONATOR

FIELD OF THE INVENTION AND RELATED ART STATEMENT

The present invention relates to an apparatus designed to activate a square plate resonator and adapted for use in a machine tool such as a lathe, plain miller or shaper which cuts a workpiece by a tool vibrated at an ultrasonic frequency.

TECHNICAL BACKGROUND AND PROBLEMS THEREOF

It has been known heretofore that a cutting resistance exerted on a workpiece is remarkably reduced if ultrasonic vibration is applied in a cutting direction to a tool held on a tool rest in a lathe or the like, whereby any abnormal vibration such as irregular shaking is eliminated to eventually enhance the cutting precision relative to the deviation from circularity of the workpiece and the surface roughness thereof with further advantages of prolonging the service life of the tool as well as facilitating the machining of a hard-to-cut material. And the desired effect is attained when the condition $V < 2\pi fa$ is satisfied, in which v is the velocity of cutting the workpiece, f is the frequency of vibrating the tool, and a is the amplitude of such vibration.

Referring now to FIG. 8, a description will be given on an exemplary cutting method carried out by a flexural vibratory tool holder which utilizes a typical vibrator of vertical oscillation system. First a flexural vibratory tool holder 5 is supported on a tool rest 1 by means of keep plates 2, clamp bolts 3 and clamp members 4. In this example, the clamp members 4 are positioned at nodes of the tool holder 5. Then a cutting tool 7 is anchored to the fore end of the tool holder 5 so as to be set opposite to a workpice 6, and both a vertical vibrator 8 and a vibration amplifier horn 9 are joined together on a vibrational loop of the tool holder 5 represented by one-dot chain lines. When the vertical vibrator 8 is driven in such arrangement, the tool holder 5 is vibrated as shown by one-dot chain lines, so that the cutting tool 7 held at the fore end thereof is also vibrated at an ultrasonic frequency in the cutting direction, hence exhibiting the required cutting effect with vibration as mentioned previously.

The apparatus of such a structure is advantageous in the point that the vertical vibrator 8 can be disposed at a positioned spaced apart from the cutting tool and is thereby attachable to an ordinary lathe with facility. However, there also exists a disadvantage that the vertical vibrator 8 is positionally impedimental to the operation and great difficulty is unavoidable in mounting the flexural vibratory tool holder 5 on the tool rest 1. Unless each of the clamp members 4 is set exactly at a proper node, there arises a problem of energy loss and the edge of the cutting tool 7 comes to vibrate in a harmful direction while firm setting thereof is requisite, hence necessitating complicated labor and great care for replacement of the tool holder 5.

Furthermore, at the point of contact between the cutting tool 7 and the workpiece 6 in the apparatus of FIG. 8, a diametrical back component force Pt is generated toward the cutting tool 7 in addition to the main component force Pc tangential to the workpiece as shown in FIG. 9, so that the resultant force P is exerted on the cutting tool to eventually produce harmful abnormal vibration, which may therefore bring about failure in achieving sufficient vibrational cutting effect. In an attempt to solve the problems mentioned above, an improvement has been proposed as disclosed in Japanese Patent Publication No. 50-20289, wherein the flexural vibratory tool holder 5 is installed with an inclination relative to the cutting direction in such a manner that a directional coincidence is attained between the vibration of the cutting tool 7 and the resultant force P. However, for enabling such inclined installation, it becomes necessary to prepare additional provision of a particular index head, an inclined table and so forth, thereby rendering the apparatus structure complicated.

OBJECT AND SUMMARY OF THE INVENTION

It is an object of the present invention to provide a novel apparatus for activating a square plate resonator with functions of generating ultrasonic vibration with facility and ensuring easy positioning and replacement of a tool.

The present invention is equipped with an annular electrostriction element having four divided segmental electrodes with the respective polarities reversed in the direction of thickness thereof, and such element is so disposed that the center lines of division become positionally coincident with diagonal lines of the square plate resonator while passing through the surface center point thereof, whereby corner portions of the resonator are effectively vibratable at an ultrasonic frequency. And if tools are attached to such corner portions respectively, ultrasonic vibration can be imparted thereto when cutting or grinding a workpiece. In case different tools are attached individually to the corner portions and the square plate resonator is set by a turret positioning mechanism, then it becomes possible to realize simple use of four kinds of tools while retaining the support regions thereof anchored, whereby inclined setting of each tool to the workpiece is executable with facility by the turret positioning mechanism.

DETAILED DESCRIPTION OF PREFERRED EMBODIMENTS

Figure 1:
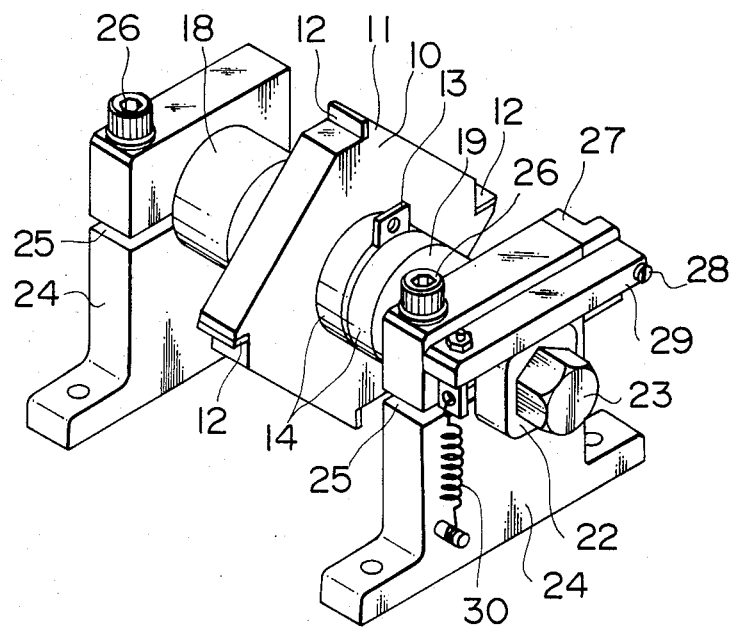
FIG. 1 is a perspective view of an exemplary apparatus embodying the present invention.
Figure 2:
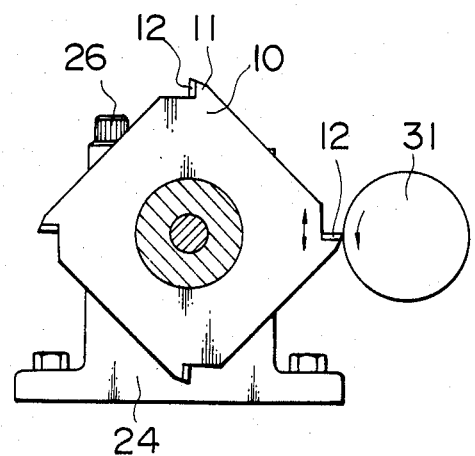
FIG. 2 is a vertical sectional side view of the apparatus shown in FIG. 1.
Figure 3:
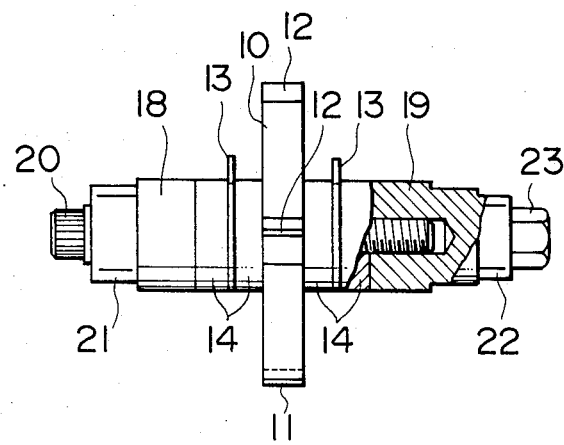
FIG. 3 is a partially cutaway front view of principal components.
Figure 4:
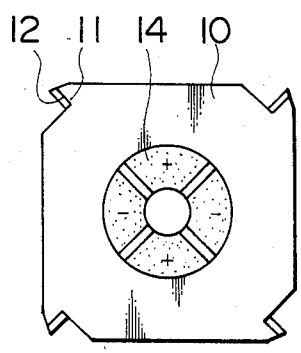
FIG. 4 is a side view of a partial structure.
Figure 5:
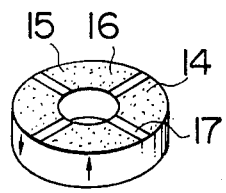
FIG. 5 is a perspective view of an annular electrostriction element.

Hereinafter an exemplary embodiment of the present invention will be described with reference to FIGS. 1 through 7. First a square plate resonator 10 is disposed therein, and cutting tools 12 are joined securely to its individual corner portions 11 by means of silver soldering or bolts. On each side of such square plate resonator 10, a pair of annular electrostriction elements 14 and an electrode plate 13 sandwiched therebetween are arrayed in alignment with lines passing through center points on the two surfaces of the resonator 10. Each of the annular electrostriction elements 14 is composed of titanate zirconate or a similar material and, as illustrated in FIG. 5, one electrode 15 out of those formed on the two sides is divided circumferentially into four segmental electrodes 16 which are so polarized that every adjacent electrodes have mutually reverse polarities in the direction of thickness as indicated by arrows. The segmental electrodes 16 are arrayed in such a manner that the center lines 17 thereof are positionally coincident with the respective diagonal lines of the square plate resonator 10.

Columnar blocks 18 and 19 are disposed on the two external sides of the annular electrostriction elements 14 and are anchored thereto integrally by means of a bolt 20. And a rectangular cam 21 partially constituting a turret positioning mechanism is formed at one end of the columnar block 18 with round portions left in the periphery thereof, while another cam 22 identical in shape to the foregoing cam 21 is also formed integrally with the columnar block 19. Furthermore, a hexagonal part 23 is formed integrally with the block 19 outside of the cam 22.

Bearing members 24 are disposed opposite to each other so as to serve as supports. The bearing members 24 have round bores into which circular portions of the columnar blocks 18 and 19 are rotatably fitted, and slits 25 extending to such round bores are formed on one side thereof. Meanwhile, on the same side where the slits 25 are existent, lock bolts 26 are provided orthogonally to the slits 25 for clamping the columnar blocks 18 and 19. An L-shaped member 27 is secured to one bearing member 24, and a lever 29 partially constituting the turret positioning mechanism is attached rotatably to a shaft 28 held by the L-shaped member 27 and is pressed against the cam 22 by means of a tension spring 30.

Designated at 31 is a workpiece set in a lathe.

Prior to commencing a machining operation in the structure mentioned above, a required tool 12 is set opposite to the workpiece 31 by first loosening the lock bolts 26 and then turning the square plate resonator 10 with rotation of the hexagonal part 23. In this stage, since the lever 29 drawn by the tension spring 30 is in abutment against the cam 22 to determine the direction, the square plate resonator 10 is fixed by tightening the lock bolts 26 in such a state.

When a voltage is applied to the electrode plate 13, it is driven in the following manner. Initially in FIG. 7 where the square plate resonator 10 is so formed as to induce resonant vibration at $\frac{1}{2}\lambda$ both vertically and horizontally, if the center of its one side is driven by a step-horn type vertical vibrator 32, then the vibration amplitude distribution on each side is contracted or expanded between the opposed sides as shown by a one-dot chain line, so that the motion becomes nil at each corner portion of the resonator 10. This phenomenon is described also in Japanese Patent Laid-open No. 58-196874 filed previously by the present applicant.

Figure 6:
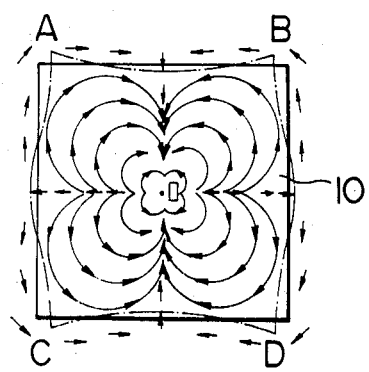
FIGS. 6 and 7 are side views illustrating displacements of a square plate resonator.
Figure 7:
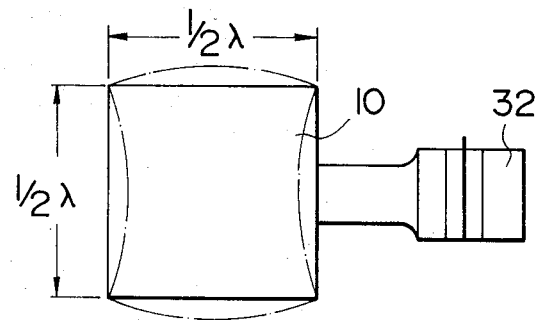
Figure 8:
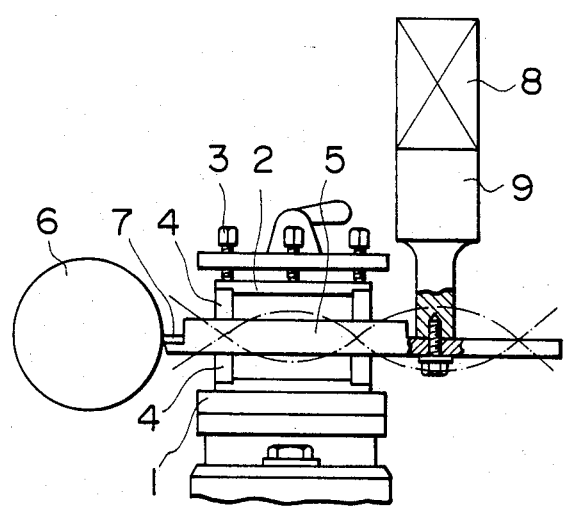
FIG. 8 is a side view of a conventional exemplary apparatus.

The above vibration mode of the square plate resonator 10 has, at a relatively high frequency, such a vibration amplitude distribution as shown by a one-dot chain line in FIG. 6. That is, the lengths of the opposite sides are contracted or expanded symmetrically with respect to an X-axis and a Y-axis passing through the surface center point O in FIG. 6, so that the displacement of each vertex is rendered orthogonal to the diagonal line with the amplitude being maximized. In the displacement of each point caused on the surface due to the vibration, its direction and length are measured as shown by arrows in FIG. 6.

Now viewing in detail the displacement distribution induced in the vibration mode of FIG. 6, angles AOB and COD are narrowed while angles AOC and BOD are widened, signifying that stresses of mutually reverse directions are increased toward the center O within the respective areas of the former and latter angles. It follows, therefore, that the areas within the angles AOB and COD are increased in thickness while the areas within the angles AOC and BOD are decreased to the contrary, and such variation becomes more marked toward the respective centers.

Figure 9:
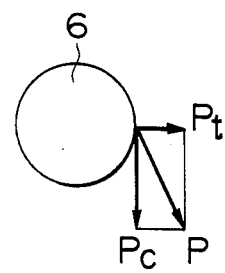
FIG. 9 is a side view showing the force applied to a cutting tool.

On the basis of the phenomenon mentioned above, if the annular electrostriction elements 14 of FIG. 5 are anchored to the two surfaces of the square plate resonator 10 and are driven, displacements indicated by arrows in FIG. 6 are imparted to the resonator 10 and thereby causes resonant vibration in the corner portions 11 orthogonally to the diagonal lines. In implementing the invention, it is desired that the vibration of the tool 12 be directionally coincident with the resultant force P of the main cutting component Pc and the back cutting component Pt as shown in FIG. 9, so that the directions of the cams 21 and 22 should be determined by taking such angle into consideration.

In an actual structure, a shield cover for protection of the live part from chips and cutting oil is provided together with leadwires for the electrode plates 13, electrode brushes and ring shoes.

As described hereinabove, according to the present invention where annular electrostriction elements are disposed in such a manner that the center lines of division are positionally coincident with diagonal lines of the square plate resonator while passing through the surface center point thereof, the corner portions of the resonator can be vibrated effectively in the direction orthogonal to the diagonal lines, so that tools attached to the corner portions are driven to cut or grind a workpiece with ultrasonic vibration. Since neither of the annular electrostriction elements requires any particular space, they are not impedimental at all to the operation. Furthermore, in case different tools are attached individually to the corner portions of the resonator and the angles thereof are indexed by a turret positioning mechanism, it is possible to realize easy positioning of the tools as well as simple replacement thereof while achieving another advantage of facilitating the inclined setting of the tools with respect to the workpiece.

I claim:

1. An apparatus for activating a square plate resonator, comprising annular electrostriction elements each having on one side thereof four segmental electrodes divided circumferentially and polarized in such a manner that every adjacent electrodes have mutually reverse polarities in the direction of thickness, said annular electrostriction elements being so disposed that the center lines of division become positionally coincident with the diagonal lines of said square plate resonator while passing through the surface center point thereof, wherein said annular electrostriction elements and said square plate resonator are clamped together by columnar blocks supported securely by means of bearing members.

2. The apparatus as defined in claim 1, wherein a tool is anchored to at least one corner portion of said square plate resonator.

3. An apparatus for activating a square plate resonator, comprising annular electrostriction elements each having on one side thereof four segmental electrodes divided circumferentially and polarized in such a manner that every adjacent electrodes have mutually reverse polarities in the direction of thickness, said annular electrostriction elements being so disposed that the center lines of division become positionally coincident with the diagonal lines of said square plate resonacot while passing through the surface center point thereof, wherein said annular electrostriction elements and said square plate resonator are clamped together by columnar blocks secured to bearing members through a turret positioning mechanism, and tools are anchored to the individual corner portions of said resonator.

4. The apparatus as defined in claim 3, wherein said square plate resonator is set by a turret positioning mechanism in such a manner that the vibration of said tools becomes directionally coincident with the resultant force of a main component and a back component produced by a cutting resistance.

* * * * *